(12) United States Patent
Takahashi et al.

(10) Patent No.: US 12,100,123 B2
(45) Date of Patent: Sep. 24, 2024

(54) IMAGE PROCESSING APPARATUS AND IMAGE PROCESSING METHOD FOR COMBINING IMAGES

(71) Applicant: CANON KABUSHIKI KAISHA, Tokyo (JP)

(72) Inventors: Yoichi Takahashi, Tokyo (JP); Takayuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 17/955,590

(22) Filed: Sep. 29, 2022

(65) Prior Publication Data

US 2023/0096541 A1    Mar. 30, 2023

(30) Foreign Application Priority Data

Oct. 26, 2021   (JP) ................................ 2021-174826
Dec. 20, 2021   (JP) ................................ 2021-206265

(51) Int. Cl.
| | |
|---|---|
| *G06T 5/50* | (2006.01) |
| *G06T 5/70* | (2024.01) |
| *G06T 5/77* | (2024.01) |
| *G06T 7/90* | (2017.01) |
| *G06V 10/24* | (2022.01) |
| *G06V 10/60* | (2022.01) |

(52) U.S. Cl.
CPC ............... *G06T 5/50* (2013.01); *G06T 5/70* (2024.01); *G06T 5/77* (2024.01); *G06T 7/90* (2017.01); *G06V 10/245* (2022.01); *G06V 10/60* (2022.01); *G06T 2207/10016* (2013.01); *G06T 2207/10024* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 6,891,970 | B1 | 5/2005 | Suzuki |
| 7,711,254 | B2 | 5/2010 | Yamasaki |
| 9,264,643 | B1* | 2/2016 | Xue ........................ H04N 25/75 |
| 9,648,238 | B2 | 5/2017 | Takahashi |
| 10,009,551 | B1* | 6/2018 | Adcock .................. H04N 5/265 |
| 11,516,402 | B1* | 11/2022 | Sandofsky ........... H04N 23/631 |
| 2013/0016252 | A1* | 1/2013 | Yoshida ................. H04N 25/58 |
| | | | 348/E5.051 |

(Continued)

FOREIGN PATENT DOCUMENTS

JP    2007-243775 A    9/2007

OTHER PUBLICATIONS

JP 2007-243775 A, [0002]-[0003], U.S. Pat. No. 7,711,254 B2.

*Primary Examiner* — Jeffrey J Chow
(74) *Attorney, Agent, or Firm* — Venable LLP

(57) ABSTRACT

An image processing apparatus obtains image data of a plurality of frames, aligns the image data of the plurality of frames, and combine the image data of the plurality of frames that have been aligned. The image data includes first data and second data, the first data being data of pixels of an effective pixel area of an image sensor and constituted by signals corresponding to a predetermined arrangement of color components, and the second data being data of pixels outside the effective pixel area of the image sensor. The image processing apparatus is capable of aligning the first data independently from the second data.

19 Claims, 7 Drawing Sheets

(56) References Cited

U.S. PATENT DOCUMENTS

| | | | |
|---|---|---|---|
| 2014/0204246 A1* | 7/2014 | Nishi | G06T 5/94 |
| | | | 348/239 |
| 2015/0078725 A1* | 3/2015 | Kobuse | G11B 20/24 |
| | | | 386/224 |
| 2016/0292837 A1* | 10/2016 | Lakemond | G06T 11/60 |
| 2018/0220047 A1* | 8/2018 | Baudat | H04N 23/81 |

\* cited by examiner

IMAGE PROCESSING APPARATUS AND IMAGE PROCESSING METHOD FOR COMBINING IMAGES

BACKGROUND OF THE INVENTION

Field of the Invention

The present invention relates to an image processing apparatus and an image processing method, and particularly relates to image combination techniques.

Description of the Related Art

A technique is known which reduces image shake by combining N number of images shot consecutively at an exposure time 1/N the required exposure time (Japanese Patent Laid-Open No. 2007-243775).

When combining a plurality of images, alignment between the images is necessary. However, if the images are simply aligned for pixels inside an effective pixel area, pixels outside the effective pixel area will be combined in a misaligned state. Therefore, a problem arises in use of the values of pixels outside the effective pixel area. Japanese Patent Laid-Open No. 2007-243775 does not take such a problem into account.

SUMMARY OF THE INVENTION

Having been achieved in light of such problems with the conventional techniques, one aspect of the present invention provides an image processing apparatus and an image processing method that enable image combination which can appropriately use pixel values outside an effective pixel area.

According to an aspect of the present invention, there is provided an image processing apparatus comprising one or more processors that, when executing a program stored in a memory, function as: an obtaining unit configured to obtain image data of a plurality of frames; an aligning unit configured to align the image data of the plurality of frames; and a combining unit configured to combine the image data of the plurality of frames that have been aligned, wherein the image data includes first data and second data, the first data being data of pixels of an effective pixel area of an image sensor and constituted by signals corresponding to a predetermined arrangement of color components, and the second data being data of pixels outside the effective pixel area of the image sensor, and the aligning unit is capable of aligning the first data independently from the second data.

According to another aspect of the present invention, there is provided an image capture apparatus comprising: an image sensor; and an image processing apparatus, wherein the image processing apparatus comprising: one or more processors that, when executing a program stored in a memory, function as: an obtaining unit configured to obtain image data of a plurality of frames; an aligning unit configured to align the image data of the plurality of frames; and a combining unit configured to combine the image data of the plurality of frames that have been aligned, wherein the image data includes first data and second data, the first data being data of pixels of an effective pixel area of an image sensor and constituted by signals corresponding to a predetermined arrangement of color components, and the second data being data of pixels outside the effective pixel area of the image sensor, and the aligning unit is capable of aligning the first data independently from the second data, wherein the image data of the plurality of frames is image data shot over time using the image sensor.

According to a further aspect of the present invention, there is provided an image processing method executed by an image processing apparatus, the image processing method comprising: obtaining image data of a plurality of frames; aligning the image data of the plurality of frames; and combining the image data of the plurality of frames that have been aligned, wherein the image data includes first data and second data, the first data being data of pixels of an effective pixel area of an image sensor and constituted by signals corresponding to a predetermined arrangement of color components, and the second data being data of pixels outside the effective pixel area of the image sensor, and the aligning is capable of aligning the first data independently from the second data.

According to another aspect of the present invention, there is provided a non-transitory computer-readable storage medium storing a program that causes a computer to function as an image processing apparatus comprising: an obtaining unit configured to obtain image data of a plurality of frames; an aligning unit configured to align the image data of the plurality of frames; and a combining unit configured to combine the image data of the plurality of frames that have been aligned, wherein the image data includes first data and second data, the first data being data of pixels of an effective pixel area of an image sensor and constituted by signals corresponding to a predetermined arrangement of color components, and the second data being data of pixels outside the effective pixel area of the image sensor, and the aligning unit is capable of aligning the first data independently from the second data.

Further features of the present invention will become apparent from the following description of exemplary embodiments (with reference to the attached drawings).

DESCRIPTION OF THE EMBODIMENTS

Figure 1:
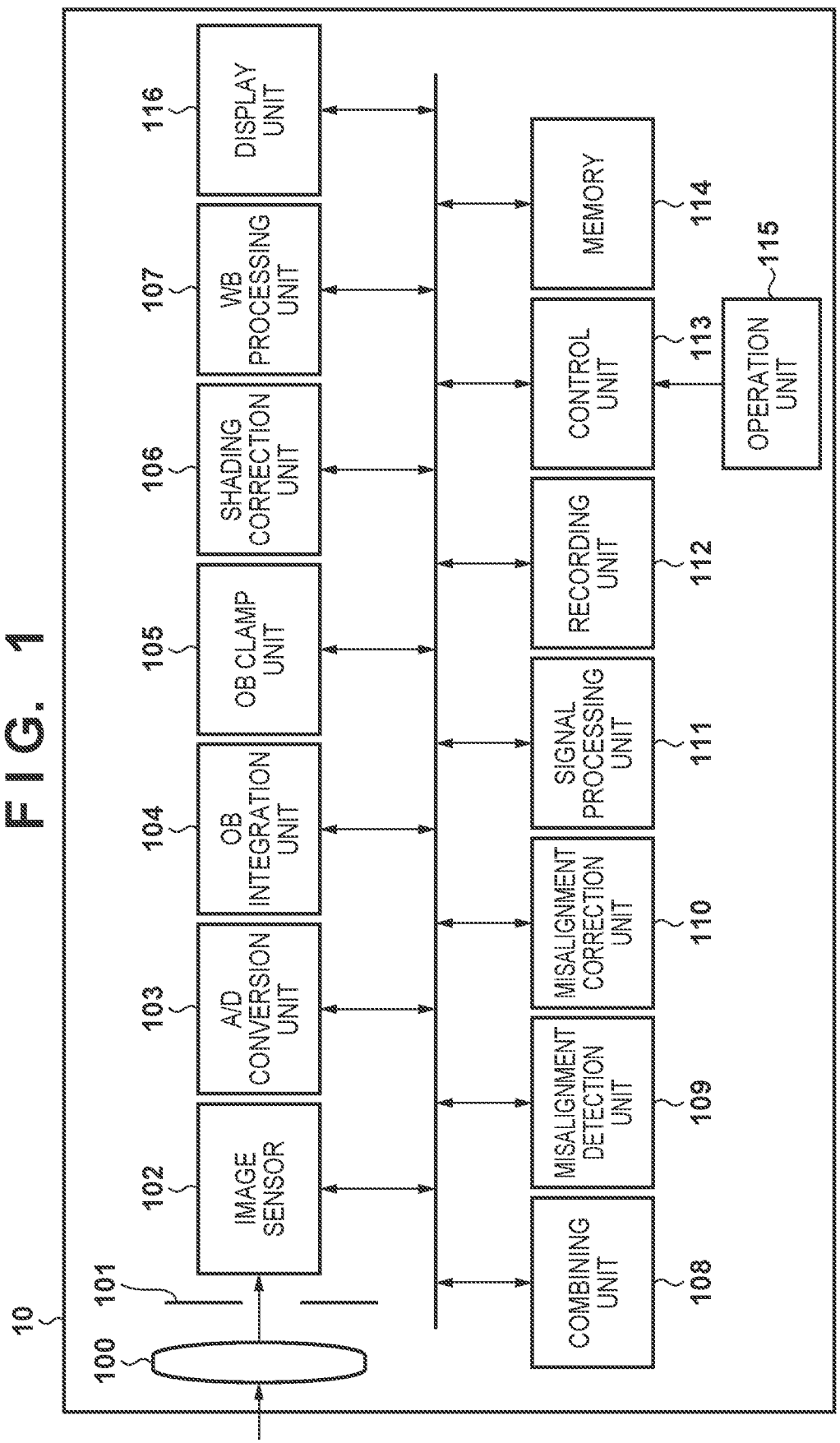
FIG. 1 is a block diagram illustrating an example of the functional configuration of an image capture apparatus serving as an image processing apparatus according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following will describe embodiments where the present invention is applied in an image capture apparatus such as a digital camera. However, an image capture function is not essential to the present invention, and the present invention can be implemented in any electronic device capable of handling image data. Examples of such an electronic device include computer devices (personal computers, tablet computers, media players, PDAs, and the like), smartphones, game consoles, robots, drones, and dashboard cameras. These are merely examples, however, and the present invention can be applied in other electronic devices as well.

FIG. 1 is a block diagram illustrating an example of the functional configuration of an image capture apparatus 10 serving as an example of an image processing apparatus according to an embodiment of the present invention.

A control unit 113 includes one or more processors capable of executing programs, RAM, and ROM. The control unit 113 can load programs stored in the ROM into the RAM and execute the programs using the processor. By executing the programs, the control unit 113 controls the operations of the constituent elements of the image capture apparatus 10, including the function blocks illustrated in FIG. 1, and/or an external device which is communicably connected. The functions of the image capture apparatus 10 can be implemented by the control unit 113 executing programs. Note that functions that can be realized by the control unit 113 executing programs may be implemented using hardware (e.g., an ASIC, an FPGA, or the like). The ROM is electrically rewritable, for example, and stores programs that can be executed by the processor of the control unit 113, as well as setting values, GUI data, and the like of the image capture apparatus 10. The control unit 113 can be in the form of a system-on-chip (SoC), a system-on-package (SiP), or the like, for example.

A shooting lens 100 has a plurality of lenses and an aperture stop, and generates an optical image of a subject. An image sensor 102 is a CMOS image sensor, for example, and has a plurality of photoelectric conversion units (pixels) arranged two-dimensionally.

Figure 2:
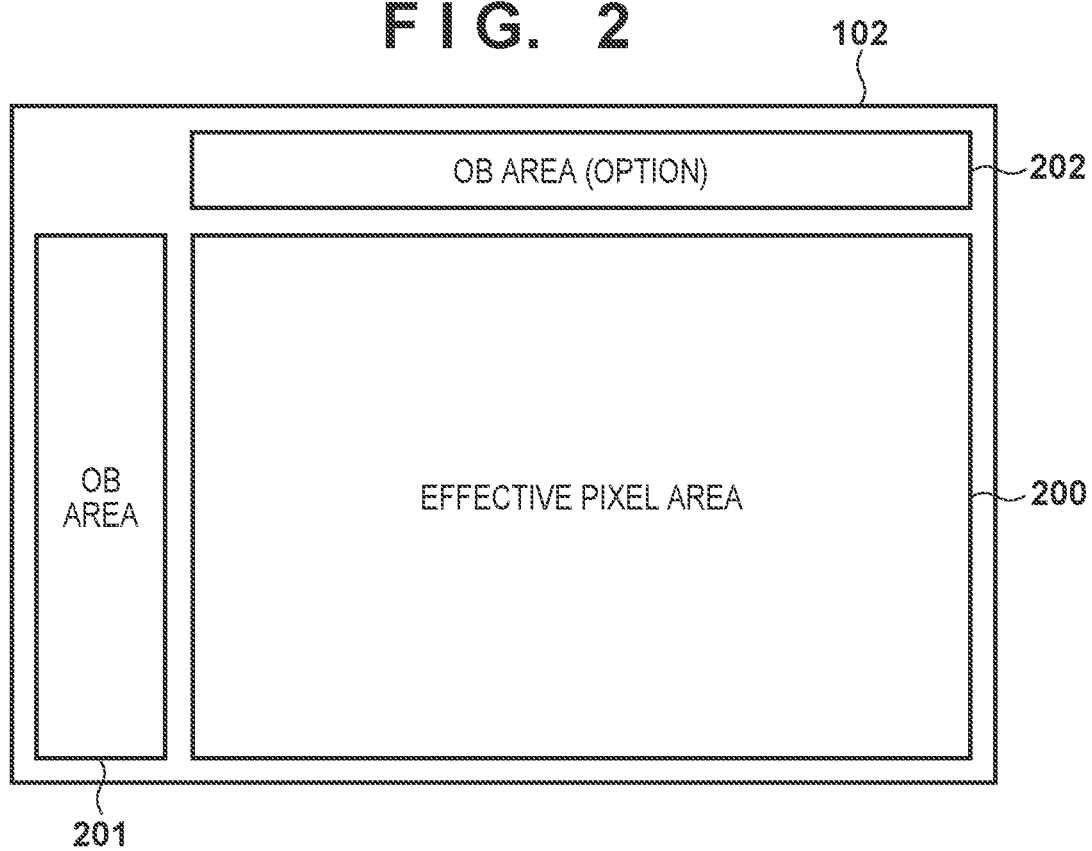
FIG. 2 is a schematic diagram illustrating a pixel area of an image sensor.

FIG. 2 is a diagram schematically illustrating a pixel arrangement in the image sensor 102. The image sensor 102 has an effective pixel area 200 and an optical black (OB) area 201 outside the effective pixel area as areas in which pixels are arranged. The effective pixel area 200 is an area used to shoot a subject image (an area that is exposed). On the other hand, the OB area 201 is an area that is not used to shoot the subject image (an area that is not exposed). Pixels in the OB area 201 may be provided with a light shielding film, for example, to prevent light from entering. A further OB area 202 may be provided above or below the effective pixel area 200. The OB area 202 can be used to calculate black levels, and can also be used for line offset correction in units of vertical pixel lines.

Aside from the presence of the light shielding film, the pixels disposed in the OB area 201 have the same structure as the pixels disposed in the effective pixel area 200. If a color filter is provided for the pixels in the effective pixel area 200, a color filter is provided for the pixels in the OB area 201 as well, in the same manner as for the pixels in the effective pixel area 200.

The effective pixel area 200 and the OB area 201 are areas of the image sensor 102, but for the sake of convenience, the present specification will use the same expressions for images obtained by the image sensor 102. For example, "image" or "effective pixel area" means an image area obtained by the pixels of the effective pixel area 200 of the image sensor 102 in an image of a single frame obtained by shooting.

The color filter is constituted by an array of unit filters of different colors, with one unit filter provided per pixel. For example, a primary color Bayer array color filter is constituted by an array of four types of unit filters, i.e., R (red), G1 (green), G2 (green), and B (blue), with 2×2 pixels serving as a unit of repetition. Hereinafter, the pixel provided with the unit filter G1 will be referred to as a "G1 pixel". The same is true for the pixels provided with the other types of unit filters.

The pixels disposed in the OB area 201 are used, for example, to detect noise components in photoelectric conversion elements (e.g., photodiodes) which the pixels include. For example, by subtracting the signal value of a pixel in the OB area 201 from the signal value of a pixel in the effective pixel area 200, offset due to noise components can be removed and the black level of the image can be corrected.

The pixels included in the image sensor 102 generate pixel signals having values corresponding to a charge amount generated during a charge accumulation period. In shooting in which a mechanical shutter 101 is opened and closed, the charge accumulation period corresponds to an exposure period. In shooting in which the mechanical shutter 101 is kept open, the charge accumulation period corresponds to a period from the time of resetting an accumulated charge until the exposure period passes. In general, the former corresponds to still image shooting, and the latter to moving image shooting, but the latter can also correspond to still image shooting.

When one charge accumulation period ends, one frame's worth of pixel signals (analog image signals) is read out from the image sensor 102. The one frame's worth of analog image signals include the pixel signals of the effective pixel area 200 and the OB area 201. The analog image signals are converted to digital image signals (a set of pixel signals in digital format) by an A/D conversion unit 103. If the image sensor 102 is capable of outputting a set of pixel signals in digital format, the A/D conversion unit 103 need not be provided.

At this stage, each pixel signal has only one color component according to the color of the unit filter which the corresponding pixel has. In the present specification, such image signals in digital format, constituted by pixel signals corresponding to a predetermined array of color components (pixel signals having only one color component corresponding to the color of the unit filter), will be referred to as "RAW data".

The RAW data output from the A/D conversion unit 103 or the image sensor 102 is first stored in memory 114. The memory 114 is used to temporarily store RAW data, image data processed by a signal processing unit 111, and the like.

An OB integration unit 104 calculates an average pixel value, for each type of pixel, of the pixel values in the OB area 201 in the RAW data. Here, the image sensor 102 has a primary color Bayer array color filter, and thus the OB integration unit 104 calculates the average pixel values of the R pixels, the G1 pixels, the G2 pixels, and the B pixels in the OB area 201. This average pixel value is used as the black level.

An OB clamp unit 105 applies OB clamp processing, which corrects the black level based on the pixel values in the OB area 201, to the pixel values in the effective pixel area 200. The OB clamp processing may specifically be processing for subtracting the average pixel values calculated by the OB integration unit 104. The OB clamp processing makes it possible to suppress bright blacks, color shifts, and the like in images obtained from the pixel signals in the effective pixel area 200. The OB clamp processing uses black levels based on the pixel type. For example, for the pixel values of R pixels in the effective pixel area 200, the black level obtained from the R pixels in the OB area is subtracted. The OB clamp unit 105 applies the OB clamp processing to each of combination source images, and to a combined image generated by a combining unit 108.

A shading correction unit 106 applies shading correction to the pixel values in the effective pixel area 200. Shading correction corrects for pixel position-based luminance reductions caused by the optical characteristics and the like of the shooting lens 100, microlenses included in the pixels, and so on. Accordingly, in the shading correction, gain is applied according to the pixel position.

A white balance (WB) processing unit 107 applies white balance adjustment processing to the post-shading correction image. The white balance adjustment processing applies gain according to the pixel type (R, G1, G2, B) to the pixel values which have undergone shading correction.

A misalignment detection unit 109 detects a misalignment amount for each of a plurality of frames of combination source images. The misalignment amount may be an absolute misalignment amount with the misalignment amount in the first frame taken as 0, or may be a relative misalignment amount relative to the immediately-preceding frame. When detecting the absolute misalignment amount, the first frame image serves as a reference image.

The misalignment detection unit 109 can detect the misalignment amount as a motion vector of the image of the effective pixel area 200 between frames. The misalignment detection unit 109 can detect the misalignment amount using any publicly-known technique, e.g., a method using template matching between frames or a method using the output of a gyrosensor or the like provided in the image capture apparatus 10. The misalignment detection unit 109 outputs the detected misalignment amount to a misalignment correction unit 110 or saves the misalignment amount in the memory 114.

The misalignment correction unit 110 aligns the images of the frames to be combined based on the misalignment amount detected by the misalignment detection unit 109. The misalignment correction unit 110 can, for example, perform the alignment by changing coordinate values of each pixel in the frames to be combined according to the misalignment amount.

Note that the misalignment correction unit 110 has two modes, namely a mode that aligns only the images from the effective pixel area 200, and a mode that aligns the images of an area that includes the effective pixel area 200 and the OB area 201 (e.g., the entire frame). In this manner, the misalignment correction unit 110 can align the data in the effective pixel area 200 (first data) independently from the data in the OB area 201 (second data). The mode of the misalignment correction unit 110 can be set, for example, by the control unit 113.

Even if the mode that aligns the entire frame is set, if conditions under which the alignment causes a drop in the accuracy of combining the OB area 201 are satisfied, the control unit 113 may change to the mode that aligns only the images of the effective pixel area 200. For example, if the number of frames in which the OB areas 201 overlap is less than a predetermined percentage of a total number of frames N, the control unit 113 can change to the mode in which only the images in the effective pixel area 200 are aligned. The number of frames in which the OB areas 201 overlap can be ascertained based on the misalignment amounts of individual frames detected by the misalignment detection unit 109.

The combining unit 108 combines a plurality of images in one of a plurality of selectable combination modes and generates a combined image. It is not necessary to apply the combination processing to the entire frame, and it is instead sufficient to apply the combination processing to the effective pixel area and the OB area in the reference image.

The combining unit 108 saves the generated combined image in the memory 114. In the present embodiment, the image capture apparatus 10 is assumed to be capable of selecting an additive mode, an average additive mode, or a comparative bright mode as the combination mode. These combination modes are examples, and other combination modes may be selectable, or there may be only one combination mode.

The image combination method in each combination mode will be described below. Here, it is assumed that images of N frames (where N is an integer greater than or equal to 2) are combined. The pixels constituting the image in each frame have coordinates (x,y) in an xy orthogonal coordinate system, a luminance value of the pixel at coordinates (x,y) is represented by I_i(x,y) (where i=1 to N), and a luminance value of the pixel at coordinates (x,y) of the combined image is represented by I(x,y). The combining unit 108 calculates the luminance value I(x,y) of each pixel in the combined image according to the combination mode as follows.

$$I(x,y)=I\_1(x,y)+I\_2(x,y)+\ldots+I\_N(x,y) \quad \text{Additive Mode}$$

In the additive mode, the combining unit 108 adds the luminance values of pixels at the same coordinates in each frame to generate the combined image. The additive mode is used, for example, when images of N frames shot with an exposure amount 1/N of the correct exposure amount are combined to produce an image with the correct exposure.

$$I(x,y)=(I\_1(x,y)+I\_2(x,y)+\ldots+I\_N(x,y))/N \quad \text{Additive Average Mode}$$

In additive average mode, the combining unit 108 generates a combined image in which the luminance value of each pixel is the average value of N frames by dividing the luminance value obtained as in the additive mode by the number of frames N. The additive average mode is used, for example, to reduce noise in images taken at high sensitivity.

$$I(x,y)=\max(I\_1(x,y),I\_2(x,y),\ldots,I\_N(x,y)) \quad \text{Comparative Bright Mode}$$

Here, max( ) is a function that extracts the maximum value of the elements in ( ) A combined image, constituted by the highest luminance value among the N pixels having the same coordinates in each frame, is obtained. Comparative bright mode is effective, for example, when combining images of fireworks or starry skies.

For coordinates for which there are no pixel values to be combined due to the coordinates changing from alignment, the combining unit 108 can instead use the pixel values of those coordinates in other predetermined frames (e.g., the first frame) in the additive mode and additive average mode. The combining unit 108 can perform the combination using only the pixel values that are present in the additive average mode or comparative bright mode (in additive average mode, the divisor is changed to the number of frames used for addition (<N)). Note that these are merely several conceivable examples, and the combination may be performed using other methods.

Additionally, the combining unit 108 ensures that images outside the effective pixel area 200 are not combined with the effective pixel area in the reference image. The combining unit 108 can handle pixel values outside the effective pixel area 200, for which the coordinates have been changed to positions overlapping the effective pixel area in the reference image due to the alignment, in the same manner as when there are no pixel values.

The signal processing unit 111 applies development processing to (uncombined) RAW data, data of a combined image generated by the combining unit 108 (combined RAW data), and the like. Note that the development processing is applied to the image area corresponding to the effective pixel area 200. "Development processing" is a collective term for multiple types of image processing, such as color interpolation processing, tone correction processing (gamma processing), and the like. Color interpolation processing is processing for interpolating the values of color components which cannot be obtained at the time of shooting, and is also called "demosaicing". As a result of applying color interpolation processing, each pixel will have a plurality of color components necessary for a color image (e.g., RGB or YCbCr), and the data will cease to be RAW data.

The signal processing unit 111 can apply detection processing such as detection of feature areas (e.g., face areas and human body areas), motion thereof, and person recognition processing, as well as combination processing, scaling processing, and encoding and decoding processing, to the developed image data. In addition, the signal processing unit 111 can apply various image processing, such as data processing including header information generation processing, evaluation value calculation processing such as generating signals and evaluation values used for automatic focus detection (AF), calculating evaluation values used for automatic exposure control (AE), and the like, and so on. Note that these are examples of image processing that can be applied by the signal processing unit 111 and are not intended to limit the image processing applied by the signal processing unit 111.

A recording unit 112 records RAW data, combined RAW data, developed image data, audio data accompanying these data, and the like in a recording medium such as a memory card, according to the shooting mode and recording settings.

"Operation unit 115" is a collective term for input devices (switches, keys, buttons, dials, a touch panels, and the like) that enable the user to make various instructions to the image capture apparatus 10.

A display unit 116 is a touch screen, for example, and is used to display live view images, playback images, GUIs, and setting values and information of the image capture apparatus 10.

Figure 4:
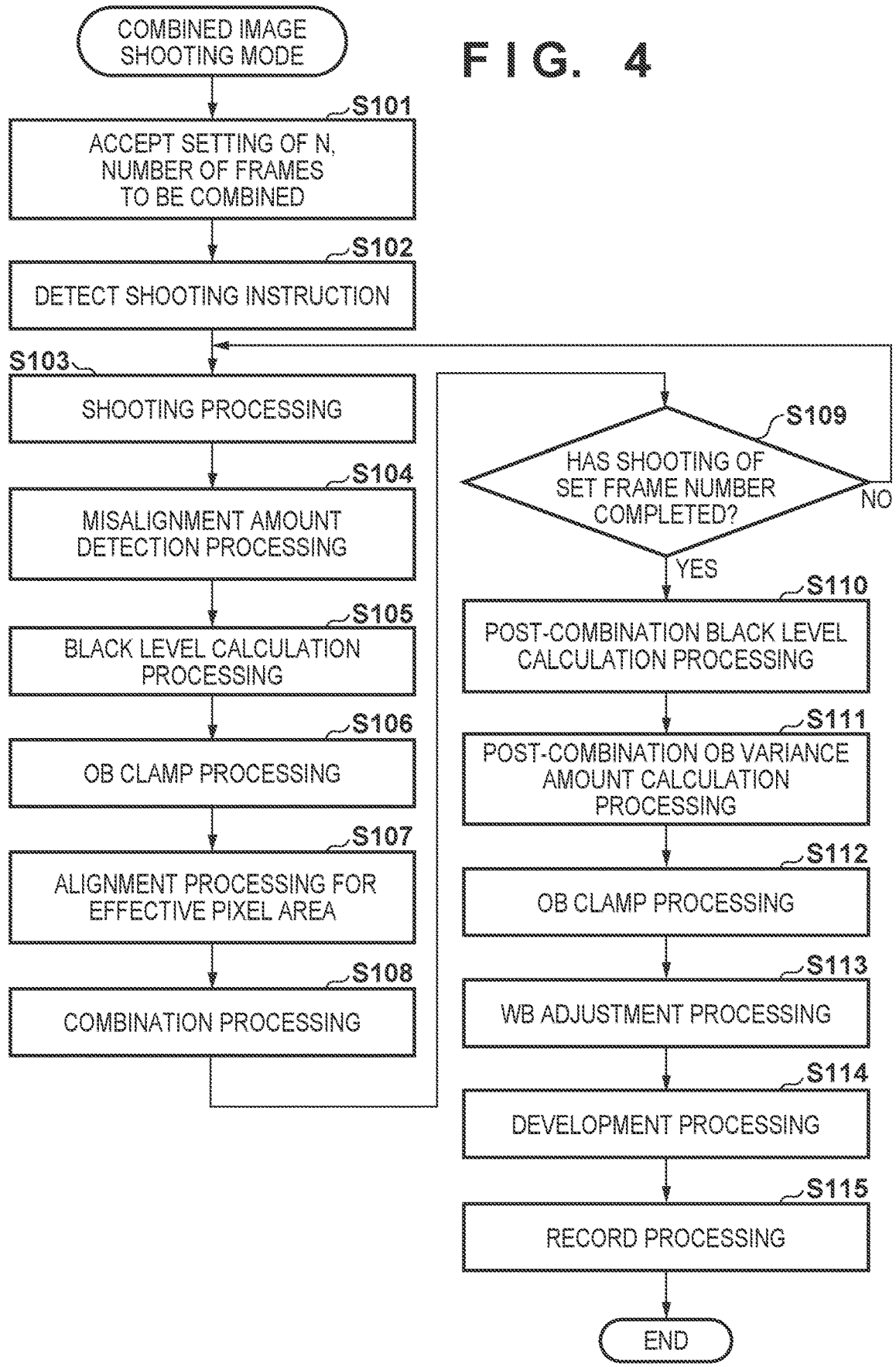
FIG. 4 is a flowchart pertaining to operations performed in a combined image shooting mode according to the first embodiment.

The flowchart in FIG. 4 illustrates operations by the image capture apparatus 10 in combined image shooting mode. Combined image shooting mode is a shooting mode in which a combined image is recorded by combining a plurality of images of frames shot over time. In the combined image shooting mode, one of the plurality of combination modes described above is set. Although this section describes still image shooting, the processing can also be executed as processing for generating one frame of a shot moving image in which each frame is used as a combined image.

In step S101, the control unit 113 accepts the setting of the number of frames N to be combined from the user through the operation unit 115. The number of frames N may be set in advance, in the same manner as the setting of the combination mode.

In step S102, the control unit 113 detects that the user has input a shooting instruction through the operation unit 115. The shooting instruction may be made by, for example, fully depressing a shutter button included in the operation unit 115. Upon detecting the input of the shooting instruction, the control unit 113 executes step S103.

In step S103, the control unit 113 executes processing for shooting one frame. The exposure conditions (shutter speed, aperture value, and sensitivity) at the time of shooting can be made the correct exposure amount obtained by executing AE processing using the live view image, for example, before step S102 (e.g., when the shutter button being depressed halfway is detected). Note that when the combination mode is the additive mode, the control unit 113 sets the exposure conditions to be 1/N of the correct exposure amount based on the number of frames N set in step S101.

The control unit 113 saves the RAW data obtained from the shooting in the memory 114. The control unit 113 skips step S104 and executes step S105 when shooting the first frame, and executes step S104 when shooting the second and subsequent frames.

In step S104, the misalignment detection unit 109 detects the misalignment amount in the image (the RAW data) obtained from the most recent instance of shooting. Here, the misalignment amount for the image in the first frame (the reference image) is assumed to be detected for all images in the second and subsequent frames. The misalignment amount is detected using template matching, where a part of the reference image is used as a template.

Here, to improve the accuracy of detecting the misalignment amount, the misalignment detection unit 109 generates a plurality of templates from the reference image and detects the misalignment amount for each individual template. The misalignment detection unit 109 then determines the final misalignment amount based on the detected plurality of misalignment amounts. The misalignment detection unit 109 can, for example, determine the most frequent misalignment amount or the average value of the misalignment amounts as the final misalignment amount, but the determination may be made through other methods as well.

In step S105, the OB integration unit 104 calculates the black level for each type of pixel using the pixel values of the OB area 201 in the image (the RAW data) obtained in the most recent instance of shooting.

In step S106, the OB clamp unit 105 applies the OB clamp processing to the pixels in the effective pixel area in the image (RAW data) obtained from the most recent instance of shooting using the black level calculated in step S105.

In step S107, the misalignment correction unit 110 aligns the image (RAW data) obtained from the most recent instance of shooting with the reference image using the misalignment amount detected in step S104. This alignment processing will be described with reference to FIG. 3.

Figure 3:
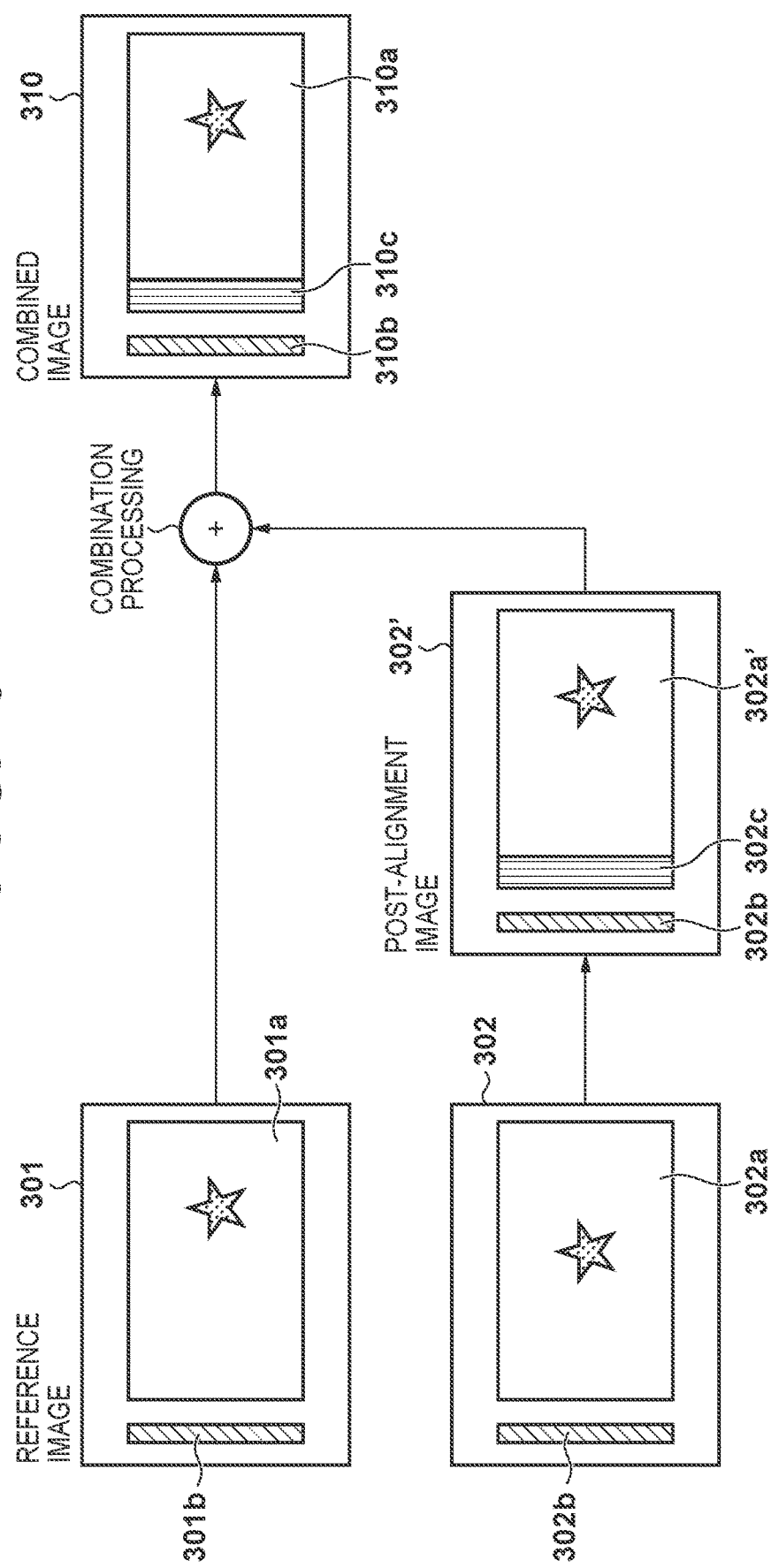
FIG. 3 is a schematic diagram illustrating RAW data combination processing according to a first embodiment.

FIG. 3 schematically illustrates combination processing in which an image 302 of the second frame (RAW data) is aligned with an image 301 of the first frame (RAW data), which is the reference image, and combined. The image 301 has an effective pixel area 301a and an OB area 301b. Likewise, the image 302 has an effective pixel area 302a and an OB area 302b.

Here, it is assumed that the mode of the misalignment correction unit 110 is set to a mode that aligns only the images in the effective pixel areas. Therefore, in a post-alignment image 302', only an effective pixel area 302a' has moved and the OB area 302b has not moved. As a result, an area 302c where no pixels are present arises in the post-alignment image 302'. When the mode of the misalignment correction unit 110 is set to a mode that aligns the entire frame, the coordinate information is changed internally, but there is no apparent change between the pre- and post-alignment image 302.

In step S108, the combining unit 108 combines the image aligned in step S107 (the image 302' in FIG. 3) with the reference image or the combined image up to the previous frame (the combined RAW data). The combining unit 108 executes the combination processing as described above according to the mode that has been set.

FIG. 3 illustrates an example of combination processing in the additive average mode or comparative bright mode, where the area 302c where no pixels are present, resulting from the alignment, is excluded from the combination. As a result, an effective pixel area 310a of the combined image 310 includes an area 310c where the image of the second frame is not combined. For the OB area 310b of the combined image 310, the OB area 301b of the first frame and the OB area 302b of the second frame are combined using a method according to the mode.

Note that if the pixel signal is affected by noise in the negative direction, the pixel value may become less than 0 when the black level is reduced by the OB clamp processing in step S106. To prevent this, a predetermined positive offset may be added to the combined image before saving the combined image in the memory 114. If an offset is added to the combined image, the images to be combined are given the same amount of offset as that added to the combined image before applying the OB clamp processing in step S105. After applying the OB clamp processing, the offset is removed from both images before applying the combination processing in step S108.

Although the flowchart in FIG. 4 illustrates the combination being performed sequentially starting from the second frame relative to the reference image, it is possible to generate combined images from the second frame to the Nth frame and combine those images with the reference image at the end. In this case, the combination from the second to the Nth frame may be performed only in the areas that overlap among all the frames. For the part of the effective pixel area of the reference image for which no combined image has been generated from the second frame to the Nth frame, a method according to the combination modes described above can be applied, assuming that there are no pixel values to be combined.

In step S109, the control unit 113 determines whether shooting of the set number of frames N has been completed. The control unit 113 executes step S110 if it is determined that the shooting is complete, and executes step S103, and executes the shooting of the next frame, if it is not determined that the shooting is complete. The control unit 113, for example, is assumed to continuously shoot images as long as a shooting instruction is continuously input. If the input of shooting instructions stops before the shooting of the set number of frames N is complete, for example, the control unit 113 may discard the results of processing performed up to that point and return to a shooting standby state.

In step S110, the OB integration unit 104 calculates the black level based on the pixel values of the OB area of the combined image saved in the memory 114. The calculation of the black level is the same as in step S105, except that the pixel values in the OB area are post-combination processing pixel values.

In step S111, the OB integration unit 104 calculates a value that indicates the variation of pixel values in the OB area of the combined image (e.g., a variance value). The variance value may be calculated for each pixel type (color), or a single variance value may be calculated for all pixels. The OB integration unit 104 may execute steps S110 and S111 in parallel.

In step S112, the OB clamp unit 105 applies the OB clamp processing to the pixel values in the effective pixel area of the combined image using the black level based on the combined image and calculated in step S110. The reason why the OB clamp processing is applied after combination, despite OB clamping being applied to the image before combination in step S106, is to reduce bright blacks caused by the combining process.

For example, when a plurality of frames of images shot at high sensitivity are combined in the comparative bright mode, each frame of the image contains a large amount of noise. Comparative bright mode combining selects the highest luminance value at each coordinate. There is therefore a greater likelihood that a luminance value that is higher than the original luminance value due to noise will be selected for each coordinate. Therefore, by applying OB clamp processing to the combined image using black levels based on pixels in the OB area 201 (the combined OB area), which has been combined in the comparative bright mode in the same manner as the effective pixel area 200, bright blacks caused by the combination can be suppressed. Although the foregoing descriptions have discussed combination in the comparative bright mode as a typical example where bright blacks arise due to the combination, bright blacks caused by the combination occur in other combination modes as well, and thus the OB clamp processing using black levels based on pixels in the combined OB area is applied to the combined image.

In step S113, the WB processing unit 107 applies white balance adjustment processing to the OB clamp processed image (the RAW data) of the effective pixel area of the combined image.

In step S114, the signal processing unit 111 applies development processing to the RAW data to which the white balance adjustment processing has been applied. The signal processing unit 111 changes the parameters of noise reduction processing applied in the development processing according to the variance value calculated in step S111. Specifically, the signal processing unit 111 changes the parameters of the noise reduction processing such that if the variance value is greater than a predetermined threshold, stronger noise reduction processing is applied than if such is not the case. This is because the amount of noise is greater when the variance value is greater than the threshold than when not. If there are more than three different strengths of the noise reduction processing, two or more thresholds may be used to adjust the strength of the noise reduction processing. The signal processing unit 111 generates image data files containing image data from the post-development processing image data.

In step S115, the recording unit 112 records the image data file generated in step S114 into a recording medium such as a memory card, an external device, or the like. In addition to or instead of the developed image data, the combined RAW data of the effective pixel area may be recorded before the OB clamp processing is applied in step S112. The information necessary for an external device to execute the processing of steps S112 to S114 (the black level calculated in step S110 and the variance amount calculated in step S111) may be added to the combined RAW data and recorded in such a state. The RAW data of the N frames of the combination source may be recorded such that an external device can execute the processing of steps S104 to S114.

When the recording by the recording unit 112 ends, the control unit 113 ends the operations illustrated in FIG. 4 and returns to the shooting standby state, for example.

As described thus far, according to the present embodiment, when combining a plurality of frames of RAW data, the alignment of the RAW data can be applied separately to the data in the effective pixel area and data in the OB area. By making it possible to align the data of the effective pixel area independently, the data in the OB area can be prevented from being combined with the data in the effective pixel area, which makes it possible to suppress a drop in the quality of the combined image. In addition, because the OB areas are not misaligned between the frames to be combined, the black level can be accurately calculated from the post-combination OB area, which makes it possible to effectively suppress bright blacks in the image caused by the combination.

Second Embodiment

A second embodiment of the present invention will be described next. The present embodiment relates to a case where line offset correction is performed in addition to the OB clamp processing. The characteristics of the numerous circuit elements formed in the image sensor experience variation due to manufacturing error and the like. For example, differences in the pixel signal offset amounts caused by variations in the characteristics of amplifiers provided in each pixel line can be seen as streak patterns in the image.

Line offset correction is processing for correcting such differences in pixel signal offsets that may arise in units of horizontal pixel lines, vertical pixel lines, or the like. The difference in the offset amount for each pixel line can be detected from the pixels in the OB area. Accordingly, line offset correction can be applied to pixel signals read out from the effective pixel area based on the difference in the offset amount for each pixel line detected in the OB area.

However, if the alignment amount differs between the effective pixel area and the OB area, the positions of the pixel lines that require line offset correction will not match between the OB area and the post-alignment effective pixel area. In particular, the alignment amount between the OB area and the effective pixel area may be different for each frame when images from a plurality of frames are combined. Accordingly, the offset amount for each pixel line detected in the post-combination processing OB area will not match the offset amount of the pixel signal in the post-combination effective pixel area, and the line offset correction therefore cannot be performed correctly.

An example in which correct line offset correction cannot be performed will be described with reference to FIG. 5. Although line offset correction for horizontal pixel lines will be described here, the same applies to line offset correction for vertical pixel lines. When performing line offset correction for vertical pixel lines, the OB area 202 illustrated in FIG. 2 is used.

Figure 5:
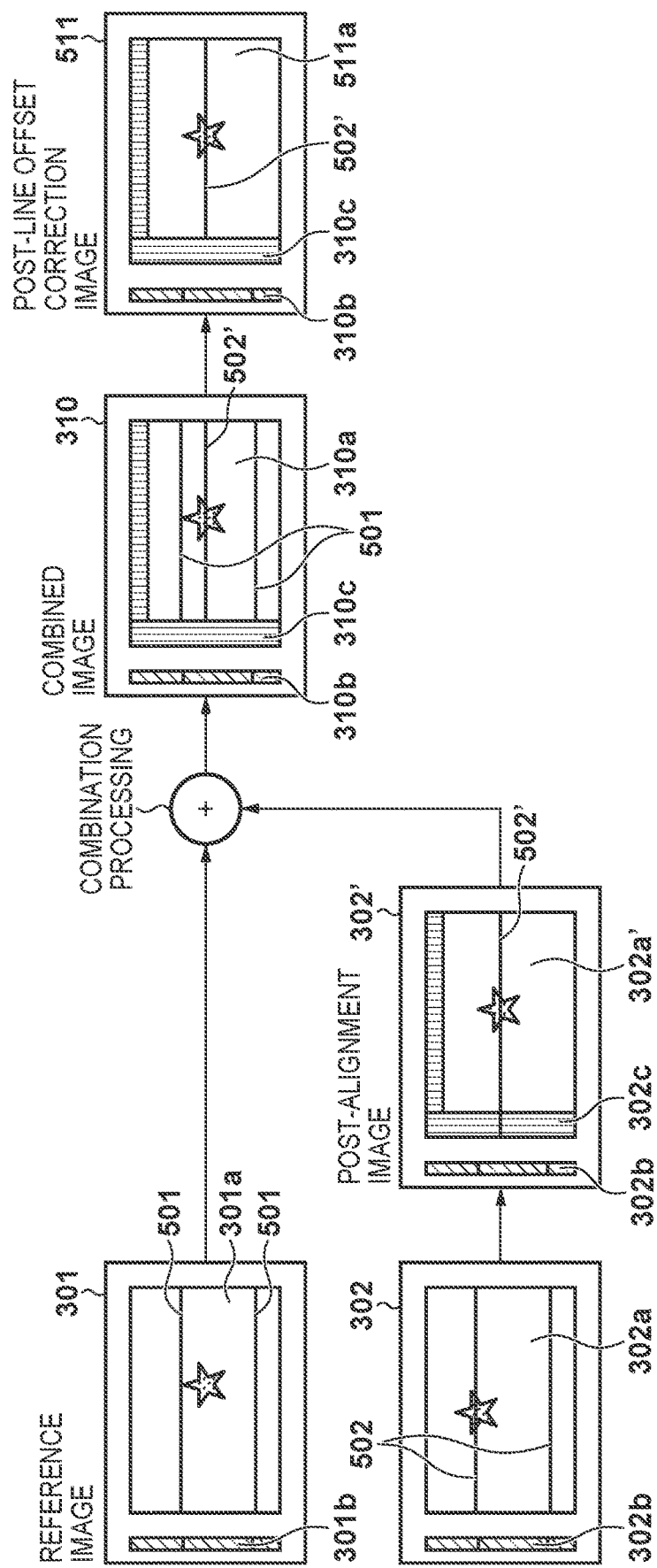
FIG. 5 is a diagram illustrating the background of a second embodiment.

FIG. 5 schematically illustrates combination processing in which an image 302 of the second frame (RAW data) is aligned with an image 301 of the first frame (RAW data), which is the reference image, and combined, with alignment amounts applied individually to the OB area and the effective pixel area. The image 301 has an effective pixel area 301a and an OB area 301b. Likewise, the image 302 has an effective pixel area 302a and an OB area 302b.

Here too, it is assumed that the mode of the misalignment correction unit 110 is set to a mode that aligns only the images in the effective pixel areas. Therefore, in a post-alignment image 302', only an effective pixel area 302a' has moved and the OB area 302b has not moved. As a result, an area 302c where no pixels are present arises in the post-alignment image 302'.

In the image 301 of the first frame (the reference image), two horizontal pixel lines having a signal offset which is larger (or smaller) than the signal offset of the other horizontal pixel lines by a set amount form a bright (or dark) streak pattern 501. Similarly, in the image 302 of the second frame, two horizontal pixel lines form a bright (or dark) streak pattern 502.

Because the positions of the horizontal pixel lines in the image sensor are fixed, a streak pattern is always formed in the same position in the captured image. Accordingly, the streak pattern is formed in the same position in the image in the first frame and the image in the second frame before aligning the effective pixel area 302a of the image in the second frame with the effective pixel area 301a of the image in the first frame.

However, the streak pattern in the image in the second frame changes in number and position in the effective pixel area 302a' of the post-alignment image as a result of aligning the effective pixel area 302a with the effective pixel area 301a of the image in the first frame.

As a result, the effective pixel area 310a of the combined image 310 of the image of the second frame and the image of the first frame contains a streak pattern 502' present in the effective pixel area 302a' in addition to the streak pattern 501 present in the effective pixel area 301a.

On the other hand, focusing on the OB areas, the OB areas 301b and 302b in the images in the first and second frame are combined without being aligned. Accordingly, the number and position of streak patterns in the OB area 310b in the combined image 310 are the same as before the combination.

The line offset correction will be described here. Line offset correction includes detecting the presence and position of streak patterns and determining an offset correction amount. The line offset correction can be executed, for example, by the signal processing unit 111.

The detection of the presence and position of the streak pattern may be the detection of pixels and their positions that have a signal level for which an absolute value of a difference from a representative signal level is greater than or equal to a threshold for a vertically-extending pixel signal sequence formed by averaging the pixel values in the OB area 310b in the horizontal direction, for example. The representative signal level may be an average value or a median value of the signal levels. The threshold can be found experimentally in advance.

If there is a pixel having a signal level for which the absolute value of the difference from the representative signal level is greater than or equal to the threshold, the position thereof corresponds to the position of the pixel line to be corrected, and the difference between the signal level thereof and the representative signal level can be used as the offset correction amount. Note that the pixel lines to be corrected and the positions thereof may be detected. The offset correction amount may be determined, and so on using methods different from those described here.

For the combined image 310, it is conceivable to apply line offset correction to the effective pixel area 310a based on the streak pattern detected in the OB area 310*b*. In this case, the streak pattern 502' of the image, in the images to be combined, for which the alignment amount in the vertical direction of the effective pixel area is not zero (the image of the second frame, here), remains in an effective pixel area 511*a* of a post-correction image 511.

The present embodiment solves the above problem by generating a combined image for line offset correction. Specifically, a combined image for line offset correction is generated by aligning the OB areas of the individual frame images to be combined with the OB area of the reference image according to the alignment amount of the effective pixel areas.

Accordingly, in the present embodiment, the following are generated.

A combined image obtained by aligning and combining the effective pixel areas (a first combined image)

A combined image for line offset correction obtained by aligning and combining the extracted OB areas (a second combined image)

A combined image for OB clamping (black level adjustment) obtained by combining without aligning the OB areas (a third combined image)

Figure 6:
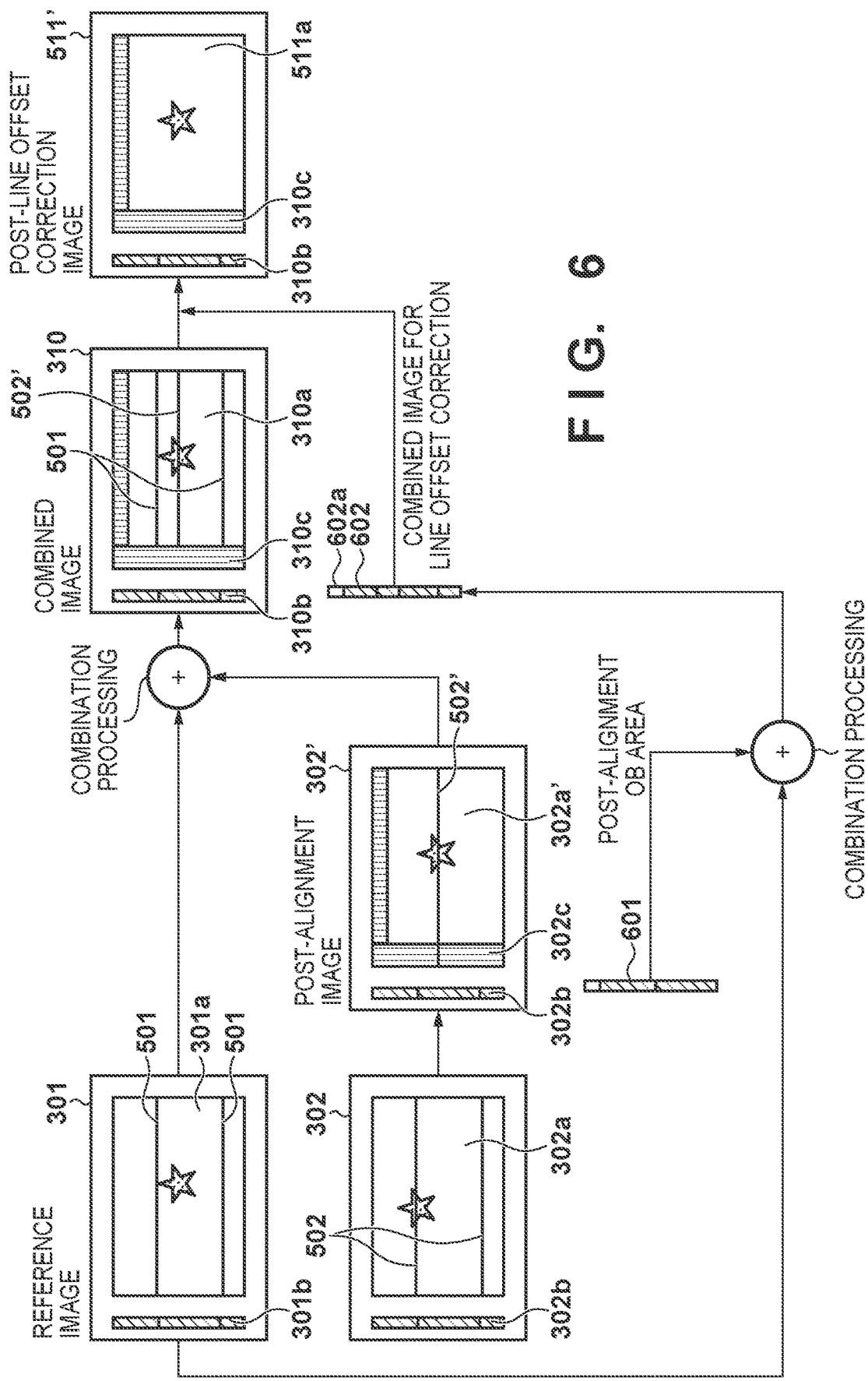
FIG. 6 is a diagram illustrating an overview of the second embodiment.

FIG. 6 illustrates an example of using a combined image for line offset correction in the same combination processing as that illustrated in FIG. 5. As illustrated in FIG. 6, the combining unit 108 extracts the OB area 302*b* of the image 302 of the second frame, which is combined with the image 301 of the first frame (the reference image), and applies a vertical direction component of the alignment amount of the effective pixel area 302*a*, to generate an aligned image 601. The combining unit 108 then combines the aligned image 601 of the OB area with the OB area 301*b* extracted from the reference image, and generates a combined image 602 for line offset correction.

Note that when combining three or more frames, the combining unit 108 extracts the OB area for each frame image except the reference image, applies the vertical component of the alignment amount of the effective pixel area and performs the alignment, and then sequentially combines the images with the OB area extracted from the reference image. In this manner, the combining unit 108 can generate a combined image for line offset correction.

Note that when aligning the OB area, only the vertical direction component of the alignment amount for the effective pixel area is applied because the target of the line offset correction is the horizontal pixel line. When the target of the line offset correction is a vertical pixel line, only the horizontal direction component of the alignment amount of the effective pixel area is applied to the OB area 202 of the frame image to align the OB area.

Note also that because the OB areas extracted from each frame are used, the combined image for line offset correction does not affect the combination of the OB areas of each frame. The combining unit 108 performs combination for line offset correction separately from the combination of OB areas used for OB clamping, the combination of the effective pixel areas, and the like.

In the combined image 602 for line offset correction, there is a streak pattern in the same position as the aligned and combined effective pixel area 310*a*. Accordingly, the streak pattern can be appropriately corrected by applying line offset correction to the post-combination effective pixel area 310*a* using the combined image 602 for line offset correction. As illustrated in FIG. 6, there is no streak pattern in the effective pixel area 511*a* of the post-line offset correction image 511'.

When applying line offset correction using the combined image 602 for line offset correction, the signal processing unit 111 may use an area of the combined image 602 that is common to all of the OB areas used to generate the combined image 602. In this case, the signal processing unit 111 does not use the areas where only OB areas of some frames are combined, such as the area indicated by 602*a* in FIG. 6, in the line offset correction.

Figure 7:
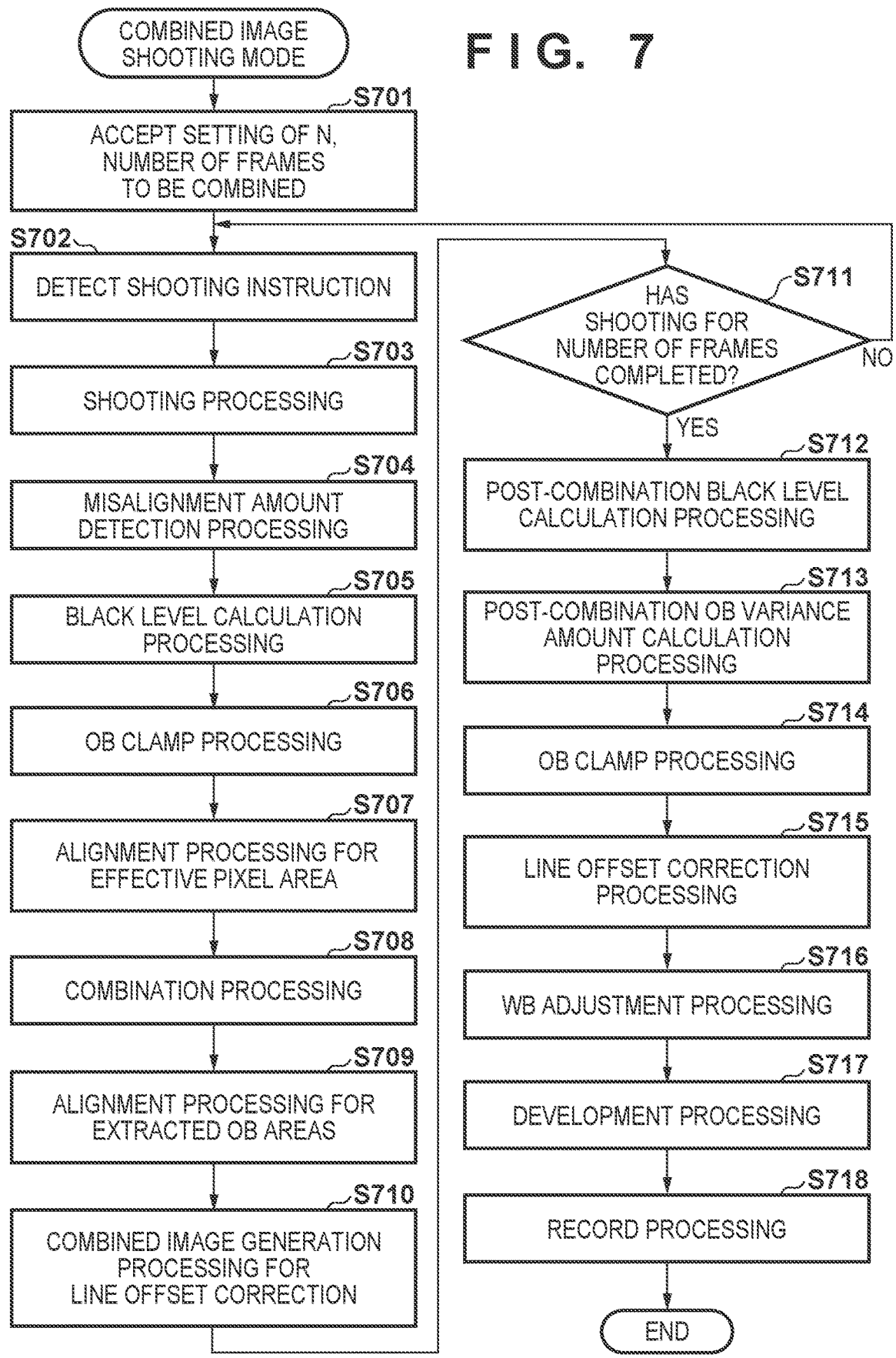
FIG. 7 is a flowchart pertaining to operations performed in the combined image shooting mode according to the second embodiment.

FIG. 7 is a flowchart that adds the processing related to line offset correction, described in the present embodiment, to the operations performed in the combined image shooting mode of the image capture apparatus 10 described in the first embodiment. Steps S701 to S708 are the same as steps S101 to S108 in FIG. 4, steps S711 to S714 are the same as steps S109 to S112 in FIG. 4, and steps S716 to S718 are the same as steps S113 to S115 in FIG. 4, and thus descriptions thereof will not be given.

In step S709, the control unit 113 instructs the signal processing unit 111 to extract the OB area from the frame image shot most recently and supply that OB area to the misalignment correction unit 110. When step S709 is first executed, the control unit 113 instructs the signal processing unit 111 to also extract the OB area of the reference image and supply that OB area to the combining unit 108. The signal processing unit 111 extracts the OB areas from the frame images according to instructions from the control unit 113 and supplies the OB areas to the misalignment correction unit 110.

The control unit 113 also instructs the misalignment correction unit 110 to apply the alignment processing to the OB areas using the alignment amount applied to the effective pixel area in the alignment processing in step S707 and supply the result to the combining unit 108. The misalignment correction unit 110 applies the alignment processing to the OB area supplied by the signal processing unit 111 and supplies the result to the combining unit 108. As described above, in the alignment processing, the misalignment correction unit 110 applies only the vertical direction component of the alignment amount when the OB area 201 is extracted, and only the horizontal direction component of the alignment amount when the OB area 202 is extracted. The misalignment correction unit 110 supplies the OB area to which the alignment processing has been applied to the combining unit 108.

In step S710, the control unit 113 instructs the combining unit 108 to generate a combined image for line offset correction. The combining unit 108 further combines the post-alignment OB area supplied from the misalignment correction unit 110 with the combined image generated most recently and stored in the memory 114. When step S710 is first executed, the combining unit 108 combines the post-alignment OB area supplied from the misalignment correction unit 110 with the OB area of the reference image supplied from the signal processing unit 111. The combining unit 108 stores the combined image of the OB area in the memory 114.

The case described here is a case where the alignment processing, combination processing, and the like for generating the combined image for offset correction are executed after the combination processing of the OB areas and the effective pixel areas of the frame images for recording is completed. However, the alignment processing and the combination processing for generating a combined image of the OB area for offset correction may also be executed in steps S707 and S708.

After the OB clamp processing in step S714 ends, the control unit 113 instructs the signal processing unit 111 to execute line offset correction in step S715. The signal processing unit 111 reads out the combined image for offset correction stored in the memory 114 and detects the presence and position of the streak pattern. If no streak pattern is detected, the signal processing unit 111 notifies the control unit 113 of the detection result (that the pattern is not detected), and does not apply line offset correction. In this case, the control unit 113 executes step S716 and instructs the WB processing unit 107 to execute the white balance adjustment processing.

On the other hand, if a streak pattern is detected, the signal processing unit 111 detects the position thereof and determines an offset correction value for each detected streak pattern. The signal processing unit 111 then applies line offset correction to the combined image, which has undergone the OB clamp processing, stored in the memory 114. The subsequent processing is the same as in the first embodiment, and will therefore not be described here.

In the present embodiment, an image in which the OB areas are aligned and combined is generated for line offset correction. Then, the line offset correction is applied to the combined image of the effective pixel area using the combined image of the OB area, which was generated for line offset correction. This makes it possible, in addition to the effects of the first embodiment, to appropriately correct streak patterns caused by variations in the circuit characteristics of the image sensor.

Other Embodiments

The foregoing embodiments describe cases where a combined image is generated at the time of shooting in the image capture apparatus. However, as mentioned earlier, a shooting function is not essential in the present invention. Accordingly, the present invention can also be implemented in an image processing apparatus that obtains one frame of RAW data shot over time and recorded, and executes step S104 (S704) and the subsequent processing, instead of shooting the image in step S103 (S703). In this case, the determination processing in step S109 (S709) determines whether a set number of frames have been obtained.

Additionally, the line offset correction described in the second embodiment need not be executed at the time of shooting. For example, by recording a combined image of the OB area for line offset correction in association with a combined image of the effective pixel area, the line offset correction can be executed in an apparatus different from the apparatus that recorded the image and at any desired timing.

Alternatively, by recording the OB area as RAW data, the generation of the combined image and the line offset correction can be executed in an apparatus different from the apparatus that recorded the image and at any desired timing.

One or more of the configurations described as function blocks separate from the image sensor 102 in the foregoing embodiments may be implemented in the image sensor 102. By making the image sensor 102 a stacked-type image sensor, the A/D conversion unit 103, the memory 114, the misalignment detection unit 109, the misalignment correction unit 110, and the combining unit 108 can be implemented in the image sensor 102.

In this case, the combined image of the effective pixel area can be generated by the image sensor 102. The combined image of the OB area for line offset correction can also be generated in the image sensor 102. The image sensor 102 may output the data of the combined image of the effective pixel area and the data of the combined image of the OB area for line offset correction as separate instances of image data, or combine those instances of image data into a single instance of image data. If line offset correction can also be performed within the image sensor, the image sensor need not output the data of the combined image of the OB area for line offset correction.

Although the second embodiment describes a combined image of the OB area for line offset correction as always being generated, this combined image may be generated only when line offset correction is determined to be necessary. Whether line offset correction is necessary can be determined, for example, by comparing shooting conditions such as ISO sensitivity and shutter speed at the time of shooting, environmental conditions such as sensor temperature and ambient temperature, and the like with predetermined thresholds.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174826, filed on Oct. 26, 2021, and No. 2021-206265, filed on Dec. 20, 2021, which are hereby incorporated by reference herein in their entirety.

What is claimed is:

1. An image processing apparatus comprising one or more processors that, when executing a program stored in a memory, function as a plurality of units comprising:
    an obtaining unit configured to obtain image data of a plurality of frames;
    an aligning unit configured to align the image data of the plurality of frames; and
    a combining unit configured to combine the image data of the plurality of frames that have been aligned,
    wherein the image data includes first data and second data, the first data being data of pixels of an effective pixel area of an image sensor and being constituted by signals corresponding to a predetermined arrangement of color components, and the second data being data of pixels outside the effective pixel area of the image sensor, and
wherein the aligning unit aligns the first data by using a first alignment amount, the first alignment amount being based on the first data or output of a gyrosensor, and does not align the second data by using the first alignment amount.

2. The image processing apparatus according to claim 1, wherein the aligning unit moves the first data and does not move the second data.

3. The image processing apparatus according to claim 1, wherein the second data is data of pixels that are not exposed.

4. The image processing apparatus according to claim 3, wherein the second data is used to adjust a black level of the first data.

5. The image processing apparatus according to claim 4, wherein adjustment of the black level is performed on each instance of image data of the plurality of frames, and on combined image data combined by the combining unit.

6. The image processing apparatus according to claim 1, the one or more processors further function as a calculating unit configured to calculate a value expressing variation in the second data of the combined image data combined by the combining unit, and
wherein a strength of noise reduction processing applied in development processing on the combined image data is determined based on the value expressing the variation.

7. The image processing apparatus according to claim 1, wherein the combining unit makes the second data, which has been aligned, not to be combined with the first data.

8. An image processing apparatus comprising one or more processors that, when executing a program stored in a memory, function as a plurality of units comprising:
an obtaining unit configured to obtain image data of a plurality of frames;
an aligning unit configured to align the image data of the plurality of frames; and
a combining unit configured to combine the image data of the plurality of frames that have been aligned,
wherein the image data includes first data and second data, the first data being data of pixels of an effective pixel area of an image sensor and being constituted by signals corresponding to a predetermined arrangement of color components, and the second data being data of pixels outside the effective pixel area of the image sensor,
wherein the aligning unit is capable of aligning the first data independently from the second data,
wherein the aligning unit aligns the second data included in the image data of the plurality of frames based on an alignment amount used to align the first data included in the image data of the plurality of frames,
wherein the combining unit generates data of a first combined image obtained by combining the first data that has been aligned, and generates data of a second combined image obtained by combining the second data that has been aligned, and
wherein the one or more processors further function as a correcting unit configured to correct the data of the first combined image based on the data of the second combined image.

9. The image processing apparatus according to claim 8, wherein the correcting unit corrects a streak pattern arising in units of pixel lines in the first combined image due to the image sensor used to generate the image data of the plurality of frames.

10. The image processing apparatus according to claim 9, wherein when the correcting unit corrects a streak pattern arising in a horizontal pixel line, the aligning unit aligns the second data using a vertical direction component among a horizontal direction component and a vertical direction component of the alignment amount used to align the first data included in the image data of the plurality of frames.

11. The image processing apparatus according to claim 9, wherein when the correcting unit corrects a streak pattern arising in a vertical pixel line, the aligning unit aligns the second data using a horizontal direction component among a horizontal direction component and a vertical direction component of the alignment amount used to align the first data included in the image data of the plurality of frames.

12. The image processing apparatus according to claim 8, wherein the one or more processors further function as:
a recording unit configured to record the data of the first combined image in association with the data of the second combined image.

13. The image processing apparatus according to claim 8, wherein the combining unit further generates data of a third combined image obtained by combining the second data which has not been aligned.

14. The image processing apparatus according to claim 13, wherein the data of the third combined image is used to adjust a black level of the data of the first combined image.

15. The image processing apparatus according to claim 8, wherein the second data is data of pixels that are not exposed.

16. An image capture apparatus comprising:
an image sensor; and
an image processing apparatus, wherein the image processing apparatus comprises one or more processors that, when executing a program stored in a memory, function as a plurality of units comprising:
(1) an obtaining unit configured to obtain image data of a plurality of frames;
(2) an aligning unit configured to align the image data of the plurality of frames; and
(3) a combining unit configured to combine the image data of the plurality of frames that have been aligned,
wherein the image data includes first data and second data, the first data being data of pixels of an effective pixel area of an image sensor and being constituted by signals corresponding to a predetermined arrangement of color components, and the second data being data of pixels outside the effective pixel area of the image sensor,
wherein the aligning unit aligns the first data by using a first alignment amount, the first alignment amount being based on the first data or output of a gyrosensor, and does not align the second data by using the first alignment amount, and
wherein the image data of the plurality of frames is image data shot over time using the image sensor.

17. An image processing method executed by an image processing apparatus, the image processing method comprising:
obtaining image data of a plurality of frames;
aligning the image data of the plurality of frames; and
combining the image data of the plurality of frames that have been aligned,
wherein the image data includes first data and second data, the first data being data of pixels of an effective pixel area of an image sensor and being constituted by signals corresponding to a predetermined arrangement of color components, and the second data being data of pixels outside the effective pixel area of the image sensor, and wherein the aligning aligns the first data by using a first alignment amount, the first alignment amount being based on the first data or output of a gyrosensor, and does not align the second data by using the first alignment amount.

18. An image processing method executed by an image processing apparatus, the image processing method comprising:

obtaining image data of a plurality of frames;

aligning the image data of the plurality of frames; and combining the image data of the plurality of frames that have been aligned, wherein the image data includes first data and second data, the first data being data of pixels of an effective pixel area of an image sensor and being constituted by signals corresponding to a predetermined arrangement of color components, and the second data being data of pixels outside the effective pixel area of the image sensor, wherein the aligning unit is capable of aligning the first data independently from the second data, wherein the aligning includes aligning the second data included in the image data of the plurality of frames based on an alignment amount used to align the first data included in the image data of the plurality of frames, wherein the combining includes generating data of a first combined image obtained by combining the first data that has been aligned, and generating data of a second combined image obtained by combining the second data that has been aligned, and wherein the image processing method further comprises correcting the data of the first combined image based on the data of the second combined image.

19. A non-transitory computer-readable storage medium storing a program that causes a computer to function as an image processing apparatus comprising:

an obtaining unit configured to obtain image data of a plurality of frames;

an aligning unit configured to align the image data of the plurality of frames; and a combining unit configured to combine the image data of the plurality of frames that have been aligned, wherein the image data includes first data and second data, the first data being data of pixels of an effective pixel area of an image sensor and being constituted by signals corresponding to a predetermined arrangement of color components, and the second data being data of pixels outside the effective pixel area of the image sensor, and wherein the aligning unit aligns the first data by using a first alignment amount, the first alignment amount being based on the first data or output of a gyrosensor, and does not align the second data by using the first alignment amount.

* * * * *